United States Patent [19]

Menigaux et al.

[11] Patent Number: 5,518,965
[45] Date of Patent: May 21, 1996

[54] PROCESS FOR PRODUCING A STRUCTURE INTEGRATING A CLEAVED OPTICAL GUIDE WITH AN OPTICAL FIBRE SUPPORT FOR A GUIDE-FIBRE OPTICAL COUPLING

[75] Inventors: Louis Menigaux, Bures sur Yvett; Adrien Bruno, Palaiseau, both of France

[73] Assignee: France Telecom, Paris, France

[21] Appl. No.: 273,435

[22] Filed: Jul. 11, 1994

[30] Foreign Application Priority Data

Jul. 9, 1993 [FR] France ................................. 93 08463

[51] Int. Cl.⁶ .................................................. H01L 21/465
[52] U.S. Cl. ...................................... 437/228; 156/647.1
[58] Field of Search .................................... 437/126, 129, 437/133, 228; 156/647

[56] References Cited

U.S. PATENT DOCUMENTS

| | | | |
|---|---|---|---|
| 4,466,696 | 8/1984 | Carney et al. | |
| 4,966,433 | 10/1990 | Blonder et al. | |
| 4,973,133 | 11/1990 | Matz et al. | |
| 5,017,263 | 5/1991 | Clark | 156/633 |
| 5,264,392 | 11/1993 | Gaebe et al. | 437/209 |

FOREIGN PATENT DOCUMENTS

| | | |
|---|---|---|
| 0361153 | 4/1990 | European Pat. Off. |
| 420028 | 9/1990 | European Pat. Off. |
| 0538633 | 4/1993 | European Pat. Off. |
| 3715071 | 2/1987 | Germany |
| 57-119314 | 7/1982 | Japan |
| 1094305 | 4/1989 | Japan |
| 2191015 | 12/1987 | United Kingdom |

OTHER PUBLICATIONS

Rothman et al., "Monolithically Integrated Laser/Rear-Facet Monitor Arrays with V-Groove for Passive Optical Fiber Alignment," *IEEE Photonics Technology Letters*, Feb., 1993, No. 2, New York.

Chen et al., "Monolithic Integration Of An AlGaAs/GaAs Surface Emitting Laser Diode And A Photodetector," *Appl. Phys. Lett.*, vol. 59, No. 27, Dec. 30, 1991.

Benelli, "New Method For Low Cost And Efficient Optical Connections Between Singlemode Fibres And Silica Guides," *Electronics Letters*, vol. 27, No. 1, Jan. 3, 1991.

Blauvelt et al., "AlGaAs Lasers With Micro-Cleaved Mirrors Suitable For Monolithic Integration," *Appl. Phys. Lett.*, 40(4), Feb. 15, 1982.

Hsu et al., "FUP-CHIP Approach To Endfire Coupling Between Single-Mode Optical Fibres And Channel Waveguides," *Electronics Letters*, vol. 12, No. 16, Aug. 5, 1976.

Hamacher et al., "A Novel Fibre/Chip Coupling Technique With An Integrated Strain Relief On InP", *Heinrich-Hertz-Institut für Nachrichtentechnik Berlin GmbH*.

Primary Examiner—R. Bruce Breneman
Assistant Examiner—Linda J. Fleck
Attorney, Agent, or Firm—Burns, Doane, Swecker and Mathis

[57] ABSTRACT

In a process for producing integrated structures having at least one cleaved optical guide, the following are successively epitaxied onto a planar surface of a monocrystalline substrate parallel to a plane of the substrate having crystal orientation <1,0,0>: an etching barrier layer for the substrate, a lower optical confinement layer, an active layer and an upper optical confinement layer. Then, the epitaxied layers are etched to form an optical guide strip having a portion oriented parallel to a first direction of crystal orientation <0,1,1> of the substrate.

19 Claims, 11 Drawing Sheets

PROCESS FOR PRODUCING A STRUCTURE INTEGRATING A CLEAVED OPTICAL GUIDE WITH AN OPTICAL FIBRE SUPPORT FOR A GUIDE-FIBRE OPTICAL COUPLING

DESCRIPTION

The present invention relates to a process for the production of a semiconductor structure more particularly monolithically integrating one or more optical guides of the strip type having a cleaved end, with a support of one or more optical fibres, the optical axis of the fibre or fibres having to coincide with the optical axis of the guide or guides.

The monolithic structure is essentially usable in the field of optical telecommunications and sensors for telemetry. In particular, the integrated structure can be used for ensuring the coupling of an optical fibre with a laser diode or an optical receiver of a heterodyne reception circuit, e.g. for coherent detection optical connection systems. This structure could also be used for optical interconnections e.g. between fast electronic chips having a high integration level or between computers or within computers.

The invention is based on the etching of a monocrystalline substrate using crystal planes of the crystal in order to define a cavity shaped like a V in the substrate for the fibre. This principle is described for a silicon substrate in document (1) by H. P. Hsu and A. F. Milton, "Flip-chip approach to endfire coupling between single-mode optical fibres and channel waveguides", Electronics Letters, vol. 12, No. 16, August 1976, pp 404–405 and in document (2) by Blonder et al, U.S. Pat. No. 4,966,433.

This principle is also used for III-V material substrates, cf. document (3) EP-A-420 028 and document (4) by M. Hamacher et al, "A novel fibre/chip coupling technique with an integrated strain relief on InP", ECOC 92, Berlin, pp 537–540, 1992.

Consideration has also been given to the production of a U-shaped etching in silicon, cf. document (5) by G. Grand et al, "New method for low cost and efficient optical connections between singlemode fibres and silica guides", Electronics Letters, vol. 27, No. 1, pp 16–18, January 1991.

The technique of a V-shaped etching of the substrate using the crystal planes is also described for the coupling of a laser diode and a photodetector in document (6) by C. Chen and S. Lee, "Monolithic integration of an AlGaAs/GaAs surface emitting laser diode and a photodetector", Appl. Phys. Lett., 59, 27, December 1991, pp 3592–3594.

From document (7) by H. Blauvelt et al, "AlGaAs lasers with micro-cleaved mirrors suitable for monolithic integration", Appl. Phys. Lett. 40(4), pp 289–290, February 1992, it is also known to produce a III-V material laser, whose output face is obtained by microcleaving of a semiconductor beam overhanging the substrate and using ultrasonic vibrations. This ultrasonic-based microcleaving technique is also described in document (4) for defining the output face of an optical guide.

In order to ensure an optimum coupling between the end of a fibre and the end of a guide structure, it is necessary for coincidence between the optical fibre axis and the guide axis. However, it is difficult to ensure this guide-fibre alignment due to the size difference between the fibre diameter and the guide width. In addition, the output face of the guide facing the fibre must be perfectly cleaved.

The aforementioned U or V-shaped etching techniques do not permit an optimum alignment between the fibre and the guide. In addition, the aforementioned ultrasonic microcleaving techniques do not ensure a perfect cleaving with a single crystal plane, which is optimum for the fibre-guide coupling, but instead a plurality of crystal microplanes. The crystal microplanes modulated by the microfractures produced by the ultrasonics are disastrous for a good fibre-guide coupling. In addition, these microcleaving methods do not permit a protection of the cleaved face during the approach of the fibre and this can lead to a deterioration of the cleaved face level with the active zone of the optical guide, particularly when said guide cleaved face constitutes the emitting part of a laser. This deterioration of the cleaved face, which is a mirror for the laser cavity, leads to a significant deterioration in the performance characteristics of said laser.

The invention specifically relates to a novel process for the production of a monolithic integrated structure having a cleaved optical guide and a coupling support for an optical fibre produced according to said process making it possible to obviate these disadvantages. In particular, it makes it possible to couple an optical fibre with an optical guide or a laser in an optimum manner without any risk of deterioration of the cleaved face of the guide or the laser with a maximum success rate with respect to the cleaving of the output face of the optical guide at the fibre end.

Moreover, in document (4), there can be no effective coupling between the strip optical guide and the optical fibre except when the end of the latter is conically tapered, which complicates the manufacture of the fibre, whereas the process according to the invention is applicable with respect to any fibre end and in particular with respect to a simply cleaved fibre.

To this end, the invention relates to a process for the production of an integrated structure having a cleaved optical guide and fibre support, comprising the following stages:

a) successively epitaxying onto a planar surface of a mon-crystalline substrate, parallel to a first plane of crystal orientation <1,0,0> of the substrate having etching barrier planes, an etching barrier layer for the substrate, a lower optical confinement layer, an active layer and an upper optical confinement layer, b) etching the epitaxied layers in accordance with a desired pattern and so as to form at least one optical guide strip, whereof at least one portion is oriented parallel to a first direction of crystal orientation <0,1,–1> of the substrate, c) covering the structure obtained in b) with a protection layer resistant to wet anisotropic chemical etching of the substrate, d) making on either side of the pattern and in the protection layer at least two openings having a longitudinal axis parallel to the first direction of the guide and communicating in a second direction perpendicular to said first direction and parallel to a cleaving plane of the structure, e) subjecting to said anisotropic chemical etching the substrate exposed during stage d), said etching operation bringing about an etching of the substrate and the formation of at least one beam oriented according to the first direction and having a free end and a fixed end; and f) subjecting said beam to the action of a pressurized fluid jet bringing about the cleaving of the beam level with its fixed end.

According to the envisaged application, the active layer can be transparent (case of a light guide) or transparent-absorbent (case of a modulator) or amplifying (case of a laser or optical amplifier), etc.

According to the envisaged application, stage b) consists of producing in the epitaxied layers in accordance with the shape adopted for the sought device (guides, lasers, amplifiers for optoelectronic circuits), e.g. a series of optical guide strips using photolithography and wet chemical etching (known in the art) in direction <0,1,−1>.

Stages c) to e) lead to an etching of the substrate below each of the beams which is sufficiently deep to permit a vertical displacement of the beam beyond its elastic limit and consequently the cleaving of each beam by the pressurized fluid jet.

However, if the distance separating the beam and the substrate is too small to permit said displacement, the fracture thereof by the fluid jet is not possible. Its deformation remains within the elastic limit and does not reach the fracture position. This is particularly the case in the processes described in documents (4) and (7). In addition, these microcleavings require the use of an ultrasonic vibration cleaving technique which is much too violent for reliably obtaining an effective cleaving.

The process of the invention is applicable to any monocrystalline substrate having etching barrier or stopping planes, which in general form an angle of 20° to 80° with the crystal direction <0,1,−1> of the substrate. These barrier planes can be <2,1,1> planes or <1,1,1> planes.

In particular, the substrate is such that for the first direction parallel to the orientation <1,−1,0>, a V-shaped etching is obtained, the branches of the V being contained in planes parallel to said first direction.

Thus, the invention is applicable to a silicon substrate using a guide structure based on silica and/or silicon nitride or preferably an InP substrate using a guide structure based on GaInAsP or InP.

During the production of an optoelectronic structure on InP, it is desirable to use an etching barrier layer for the substrate which is compatible with the sought optical performance characteristics and in particular such a layer which does not absorb for the light used, because the same is retained between the guide structure and the substrate in the final component. Preference is given to the use of a GaInAsP layer, whereas the InGaAs used in document (4) absorbs the light transmitted or emitted by an InP structure. (For a laser of InP, emission occurs at around 1.55 μm).

The fluid jet can be a pressurized water jet, a gas jet or any other such mechanical pressure source. In particular, said fluid jet is a pressurized air jet.

The protection layer must be made from a material which cannot be chemically etched by the etching solution used for the substrate. In the case of an etching solution based on orthophosphoric acid and hydrochloric acid for InP etching, it is possible to use a silicon nitride layer, a silicon oxide layer or a silicon oxynitride layer and in general all layers able to resist chemical etching solutions.

Prior to stage f), if necessary, it is possible to make at least one notch in the structure, level with the fixed end of the beam used for initiating cleaving. This notch can be formed at any point both on the beam and on its anchoring point, provided that the notch is in the vicinity of the fixed end.

The opening of the mask defines the shape of the etching of the substrate in the <1,0,0> plane. These openings can be rectangular, in accordance with said <1,0,0> plane, with a width varying in a continuous manner, e.g. in accordance with a double cone shape, or a width varying sequentially so as to define in said plane steps.

This can be achieved by shaping in the protection layer and on each side of the pattern, at least two openings having a complimentary shape and symmetrical with respect to an axis parallel to the first direction.

In order to ensure an easy manipulation of the structure obtained, it is possible to etch the structure obtained in f), so as to eliminate at least part of the structure projecting from said cleaving plane.

The monolithic structure obtained is mainly intended to serve as a support for optical coupling of one or more optical fibres with one or more guide structures, which can be laser or other structures, or can be guide-laser assemblies, etc. The invention also relates to a monolithic optical coupling support of at least one optical fibre, the etching beneath the beam leading to a V-shaped recess serving as a support for the fibre.

An optimum guide-fibre coupling is obtainable through an appropriate choice of the dimensions, namely the thicknesses of the epitaxied layers, the widths of the guides, the lengths of the beams, the V-openings (continuously or sequentially variable).

According to a variation of the invention it is also possible to realize the strip of the optical guide in another direction than the direction <0,1,−1>. For instance, in a such a variation of the invention the guide can be oriented parallel to the direction <0,1,1>.

In this case, the process of the invention comprises following steps:

a)—successively epitaxying onto a planar surface of a monocrystalline substrate, parallel to a first plane of crystal orientation <1,0,0>, an etching barrier layer for the substrate, a lower optical confinement layer, an active layer and an upper optical confinement layer, b)—etching the epitaxied layers in accordance with a desired pattern and so as to form at least one optical guide strip, whereof at least one portion is oriented parallel to a first direction of crystal orientation <0,1,1> of the substrate, c)—covering the structure obtained in b) with a protection layer resistant to a chemical etching and to a ion etching, d)—making in the protection layer a U-shaped opening surrounding an end of the pattern, said U-Shaped opening comprising a said transversal part in front of the end of the pattern and branches extending on either side of a portion of the pattern, e)—carrying out a ion etching in the opening for obtaining a V-shaped etching the branches of which are perpendicular to said first direction and perpendicular to said planar surface, f)—covering the substrate in a region corresponding to the transversal part of the opening with a mask resistant to anisotropic chemical etching, g)—carrying out a selective anisotropic chemical etching in a part of the opening comprising the branches so as to form a beam oriented according to the first direction, and having a free end and a fixed end, and h)—subjecting said beam to the action of a pressurized fluid jet bridging about the cleaving of the beam at the level of its fixed end.

The invention is described in greater detail hereinafter relative to non-limitative embodiments and with reference to the attached drawings, wherein show:

FIGS. 2 to 9 diagrammatically the different stages of the production of the support of FIG. 1, FIGS. 2, 4, 5 and 7 being cross-sectional views and FIGS. 3, 6A, 6B, 6C and 8 plan views, whilst FIG. 9 is a longitudinal sectional view.

Figure 1:
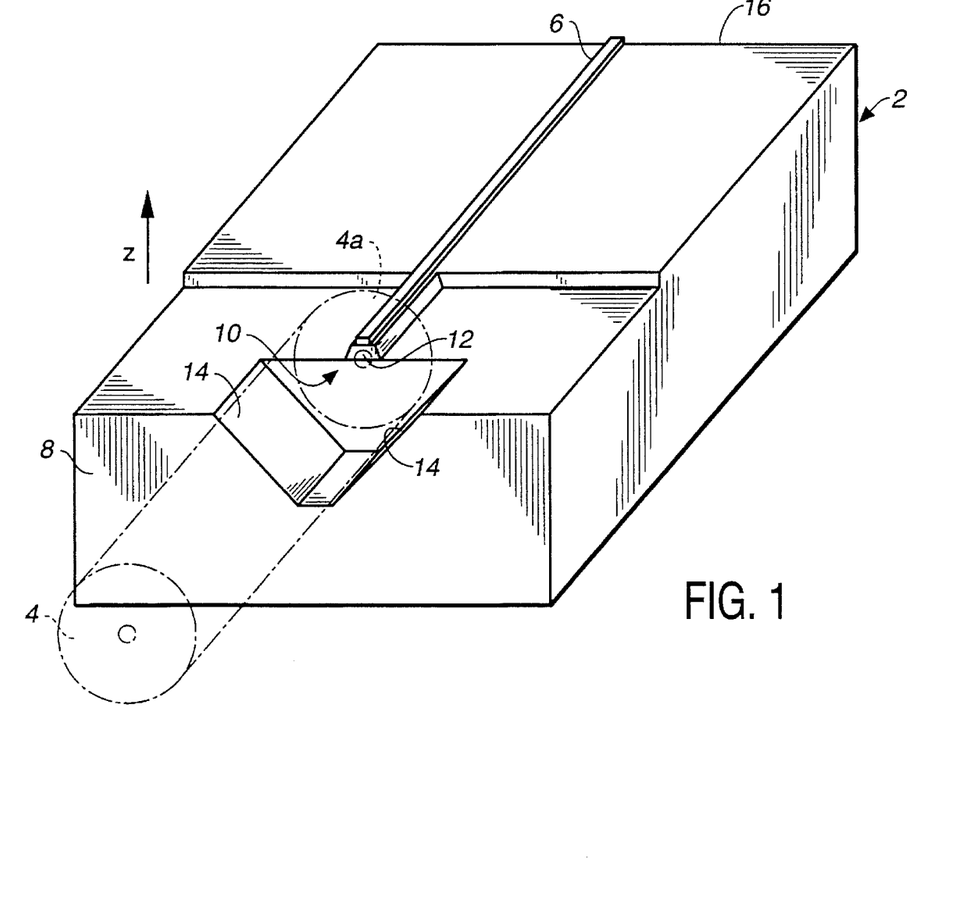
FIG. 1 Diagrammatically in perspective an optical coupling support for an optical fibre according to the invention.

FIG. 1 shows a guide and fibre-carrying monolith 2 for supporting a fibre 4 and having a guide 6. The optical axis of the fibre 4 and the optical axis of the guide 6 coincide. The fibre 4 is placed in a V-shaped recess 10 in accordance with a plane perpendicular to the substrate surface 16 and to the direction of the guide 6. The guide 6 has a cleaved face 12 oriented perpendicular to the optical guide 6 and facing the cleaved end 4a of the optical fibre 4.

The positioning of the optical fibre 4 in such a way that the fibre core faces the active cleaved zone of the guide 6 is ensured by the lateral faces 14 of the recess defining the branches of the V.

According to the invention, the surface of the substrate 16 on which is formed the guide 6 has a <1,0,0> orientation. The guide 6 is parallel to the crystal orientation <0,1,–1> of the substrate and the faces 14 of the V-shaped recess 10 are <2,1,1> of the substrate 8 which are etching barrier or stopping planes.

As a result of the process according to the invention, the optical coupling between the fibre 4 and the guide 6 is optimum and permits a mechanical stability of the fibre-support assembly. Moreover, the risk of deterioration of the cleaved face 12 of the guide during the approach of the fibre 4 are greatly reduced compared with the known process for producing said support.

In addition, with the support according to the invention, it is possible to bring about the positioning of the core of a fibre to within less than 1 μm in the vertical direction Z.

Figure 2:
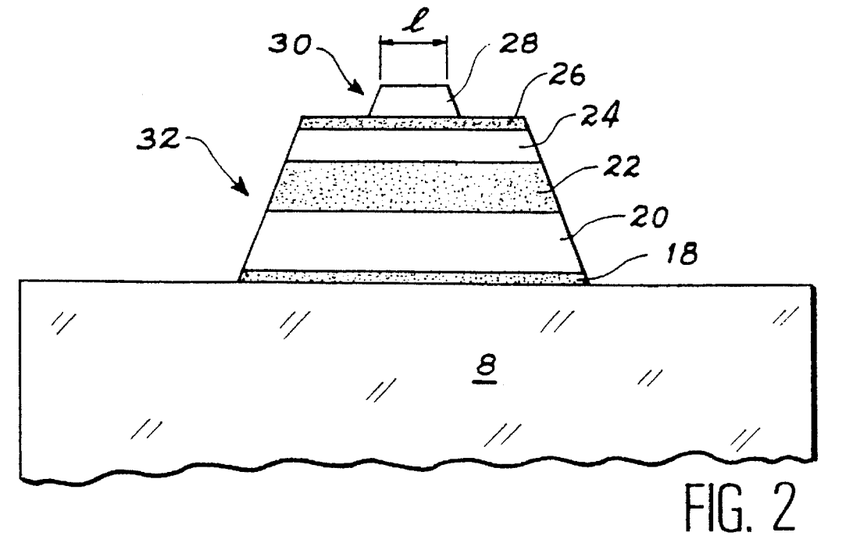

A description will now be given of the production, according to the invention, of the fibre coupling support of FIG. 1. Firstly, and as shown in FIG. 2, there is a successive epitaxy of the different semiconductor layers of the monolithic structure having an optical guide which it is wished to couple to an optical fibre, on the surface 16 of substrate 8 of crystal orientation <1,0,0>, as well as the etching barrier layers.

Thus, in order, there is an etching barrier layer 18 above the GaInAsP substrate with a thickness of 25 nm, an optical confinement InP layer with a thickness less than 1 μm, an active GaInAsP layer 22 with a thickness of 650 nm, an upper InP optical confinement layer 24 with a thickness of 300 nm, a GaInAsP etching barrier layer 26 of thickness 25 nm and then an InP layer 28 of thickness 700 nm.

The composition of the layer 18 and that of the layer 26 must be such that the substrate 8 and the layer 28 respectively are selectively etchable with respect to said layers 18 and 26. In and P contents in the GaInAsP of respectively 0.743 and 0.405 can be used (for a formula $In_{0.743}Ga_{0.257}As_{0.595}P_{0.405}$).

Moreover, the composition of the layer 22 must be such that it has a refractive index higher than that of the confinement layers 20 and 24. In particular, the In and P compositions of the layer 22 can be respectively 0.743 and 0.405.

Following the epitaxy of these layers by MOCVD (chemical vapour deposition using organometallics) or other known epitaxy or deposition methods, there is an etching of the layer 28 in order to form a strip 30 ensuring the lateral confinement of the light in the active layer 22. The strip typically has a width 1 of 3 μm and a length L (shown in FIG. 3) of several hundred μm. This etching takes place chemically using a mixture of HCl and $H_3PO_4$ in a volume ratio of 1:1. According to the invention, the largest dimension L (FIG. 3) of the strip is parallel to the crystal direction <0,1,–1> of the structure.

Figure 3:
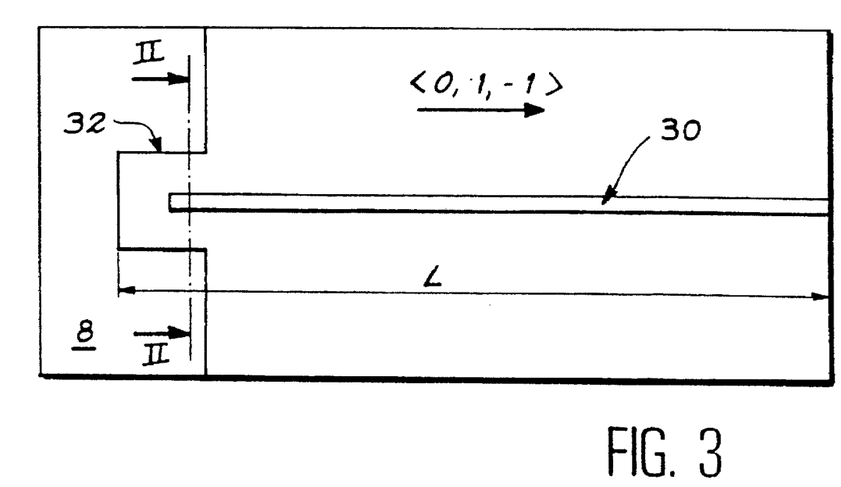

This is followed by an etching of all the layers in order to give the shape of the guide structure. The pattern obtained carries the reference 32. The etching of the InP layer is carried out as hereinbefore and the etching of the GaInAsP layers is carried out by chemical etching using a solution of $H_3PO_4$ and HCl in a volume ratio of 1:1.

FIGS. 2 and 3 respectively show the final structure obtained following the different etching operations, both in section and in plan view.

Figure 4:
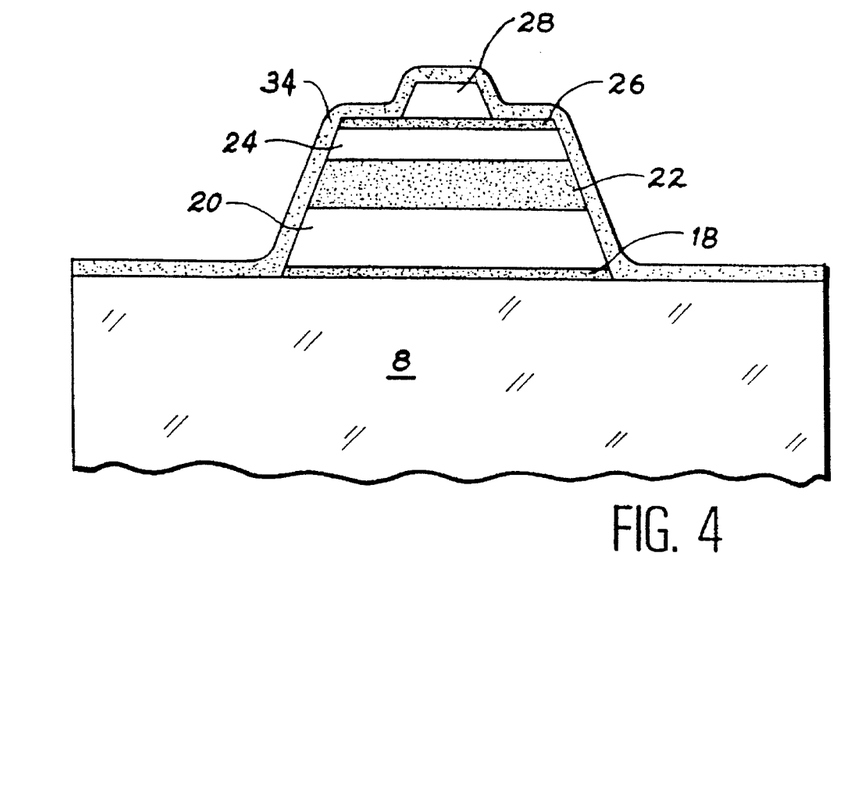
Figure 5:
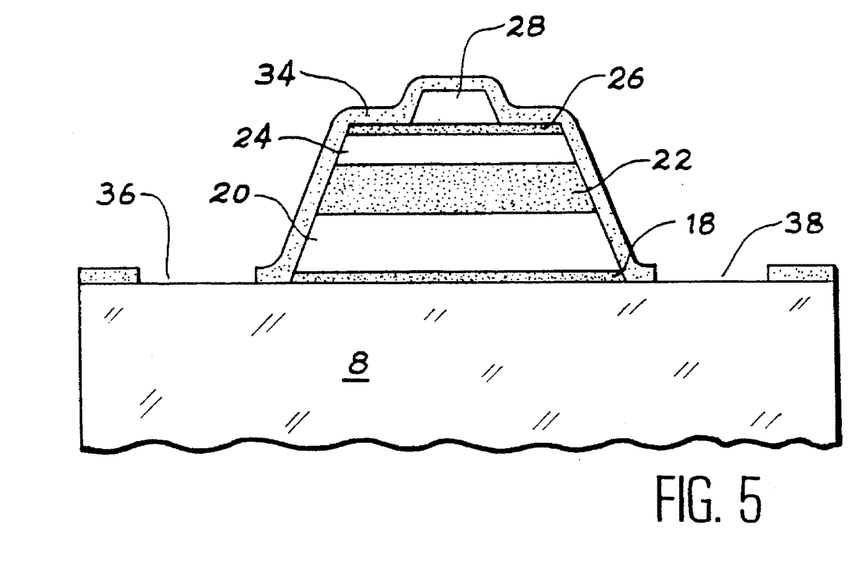
Figure 6A:
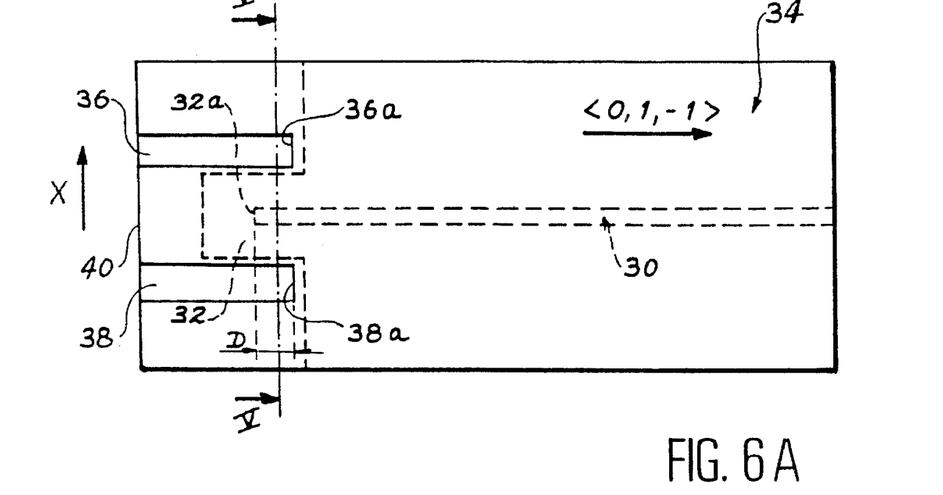

The etched structure 32 and the substrate obtained, as shown in FIG. 4, are then covered by a roughly 100 nm thick $Si_3N_4$ protection layer 34. Finally, and as shown in FIGS. 5 and 6 respectively in section and plan view, two longitudinal openings 36 and 38 are formed in the nitride layer 34 on either side of the etched pattern 32. These openings 36, 38 are oriented parallel to the direction <0,1,–1> of the crystal structure and communicate with one another by the specimen edge 40, which is perpendicular to the substrate surface 16 and to the direction <0,1,–1>. The direction of the edge 40 is designated x. Thus, the specimen edge 40 is parallel to a cleaving plane of the structure.

In addition, the ends respectively 36a and 38a (FIG. 6) of the openings 36 and 38, opposite to the edge 40, are also parallel to the cleaving planes in accordance with x of the structure and located at a distance D set back with respect to the end 32a of the etched pattern 32. This distance D can vary between a few and a few hundred μm, as a function of the thickness of the structure to be cleaved.

Figure 7:
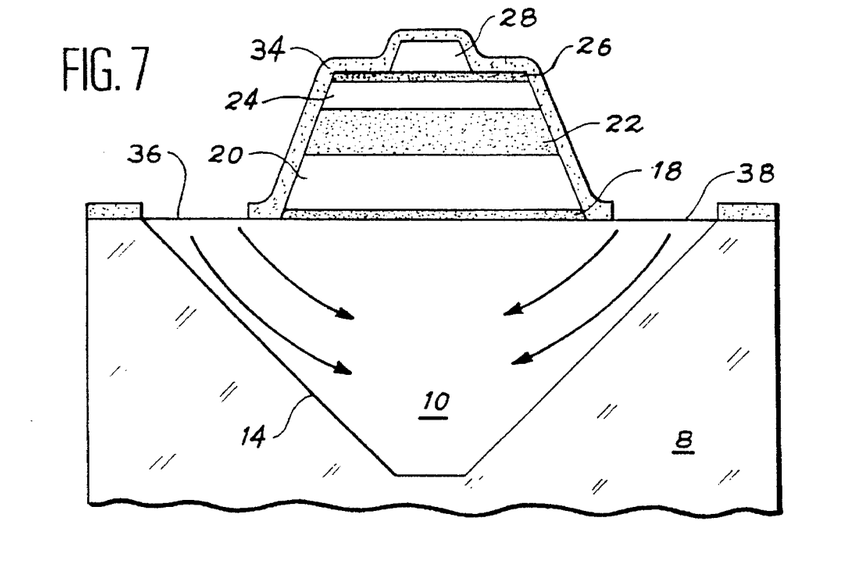

This is followed by a wet chemical anisotropic etching of substrate 8 exposed during the formation of the openings 36 and 38 using the thus etched layer 34 as the etching mask and as shown in section in FIG. 7. The chemical etching of the substrate takes place using a mixture of HCl and $H_3PO_4$ in a volume ratio of 1:1.

As a result of the communication of the openings 36 and 38 by the specimen edge 40, there is a complete etching 10 of the substrate 8 below the pattern 32, leading to the formation of a flexible beam 42 overhanging the substrate 8. The recess 10 obtained in this way in the substrate 8 is shaped like a V in the plane of the drawing.

The lateral faces 14 of the V are in fact etching stopping planes <2,1,1> of the substrate 8. Thus, the chemical etching is not laterally propagated beyond said etching planes.

Figure 8:
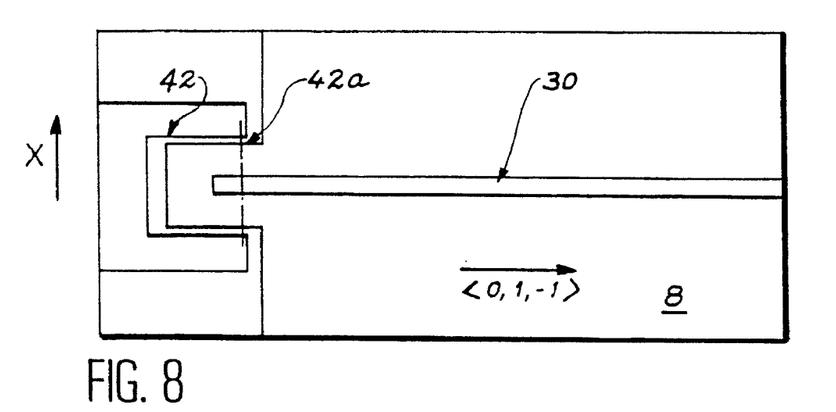

FIG. 8 shows in plan view the structure obtained after the elimination of the silicon nitride mask 34. The beam 42, fixed by its end 42a, referred to as the fixed end, is subject to the action of a pressurized fluid jet and in particular a pressurized air jet, leading to the cleaving of the beam level with its fixed end 42a and in the direction x. The structure obtained is that shown in longitudinal section in FIG. 9.

Figure 9:
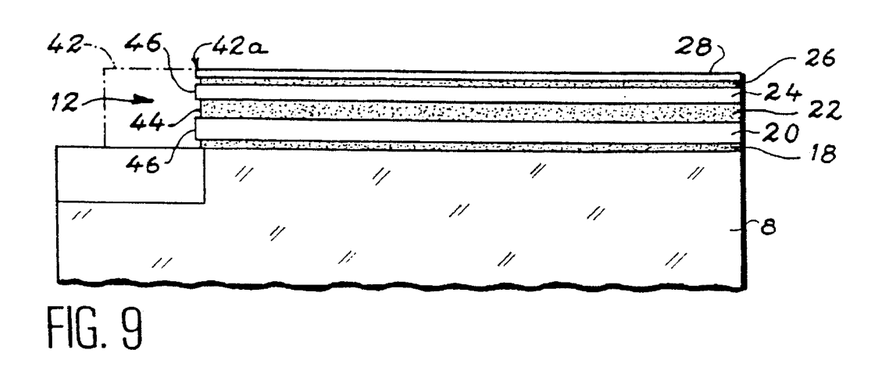

This microcleaving technique is gentle and makes it possible to obtain a face 12, which is effectively cleaved for the optical guide.

Moreover, as shown in FIG. 9, a slight selective chemical etching leads to the obtaining of a contraction 44 of the active layer 22, thus ensuring its protection during the approach of the optical fibre with respect to the cleaved face 12, the protuberance 46 on either side of the layer 44 preventing the fibre ends from striking said active layer. Thus, the process according to the invention makes it possible to reduce the risk of deterioration of the cleaved face of the active zone, unlike the prior art processes.

According to a particular embodiment of the invention the two openings 36, and 38 made in the protective layer 34 have in the direction of the guide, respectively different lengths. This appears namely on FIG. 6B. The ends 36a and 38a are at different distances from the edge 40. When cleaving the beam, a little protuberance may appear in its axis, i.e. near the optical guide, this protuberance possibly coming with crystalline defects.

Figure 6B:
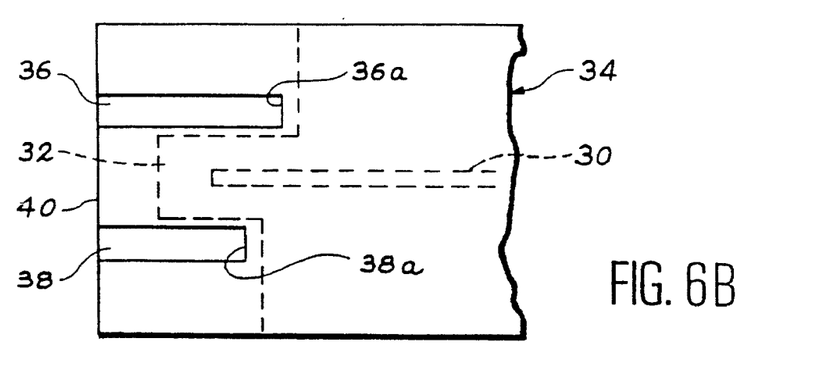

When, the openings 36, 38 have different lengths, it is possible to obtain a slightly dissymetrical bean and thus a dissymetrical cleaving. The possible crystalline defects are therefore shifted out from the beam axis and thus out from the optical guide. Thus, they do not risk to disturb the light from the optical guide.

Figure 6C:
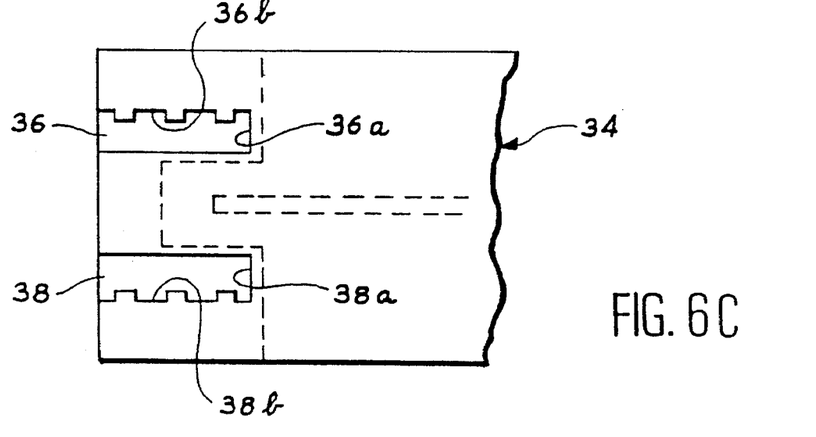

According to another particular embodiment of the invention, the openings 36, 38 made in the protection layer 34 have according to the longitudinal axis respectively an outer crenelated edge. The "outer" edge means the edge of each opening 36, 38 which is the furthest edge from the optical guide.

The outer crenelated edges are shown on FOG. 6C with references 36b and 38b respectively.

Figure 6D:
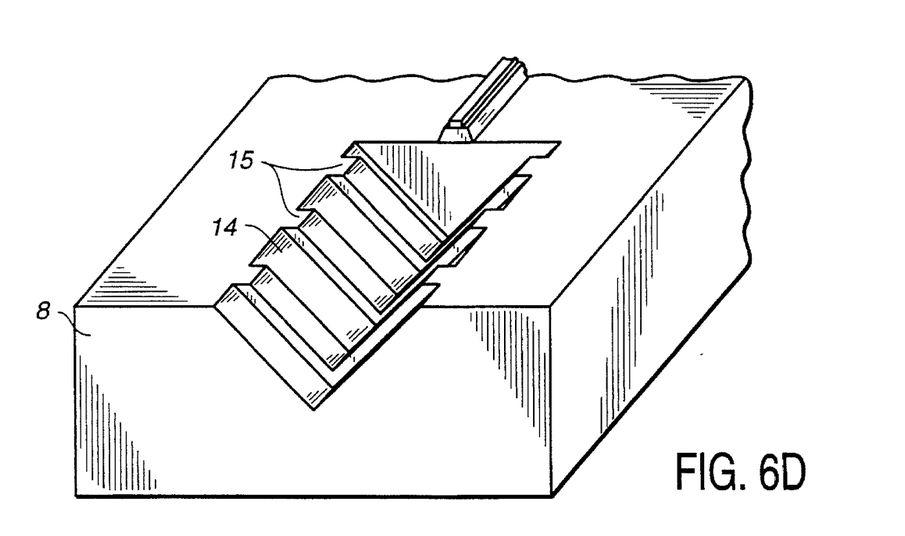
FIG. 6D is a diagrammatical view in perspective of a detail at a magnified scale of the realisation of the support of the invention according to FIG. 6C, FIGS. 10 and 11 Variants of the bi-fibre optical coupling support according to the invention.

Thanks to the crenelated edges, during the chemical etching, ribs 15 are formed on the lateral faces 14 of the V (FIG. 6D). The ribs allow to reduce the contact surface between the optical fiber and the lateral faces and to make their assembling more accurate. Indeed, during the chemical etching of the lateral faces, crystalline defects may appear limiting the accuracy of the fiber fitting. Thanks to the ribs, the surface of planes <1,1,1> or <2,1,1> in contact with the fiber according to the direction <1,0,-1> is reduced. The probability of a crystalline defect liable to hinder the accurate assembling is thus reduced. The FIG. 6D shows by way of example, very schematically, the lateral faces 14 of the V with the ribs 15.

Figure 10:
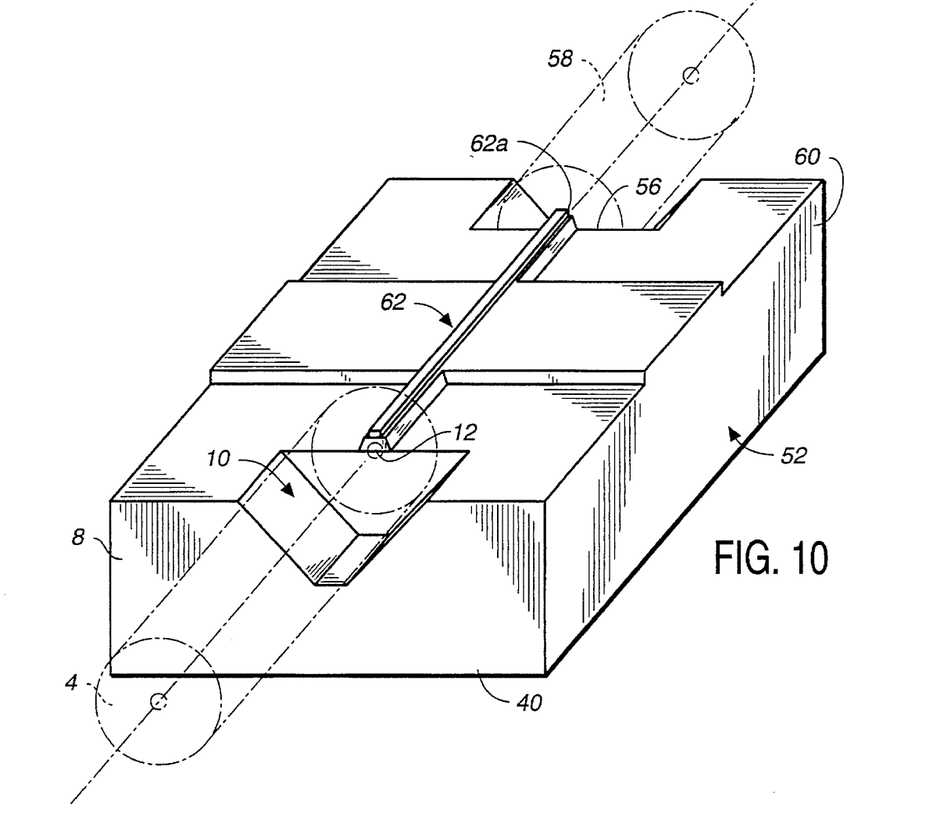

FIG. 10 shows a variant of the fibre support according to the invention. This support 52 differs from the support 2 of FIG. 1 by the fact that it has a second V-shaped recess 56 located in the extension of the optical guide 62, thus permitting the supporting of a second optical fibre 58. The construction of this bi-fibre support 52 is identical to that described hereinbefore with the exception of the shape of the etching mask, which must have two other openings oriented in direction <0,1,-1> and formed on the side 60 opposite to the specimen edge 40. This optical guide 62 consequently has a second auto-protected cleaved face 62a facing the cleaved ends of the fibre 58.

Figure 11:
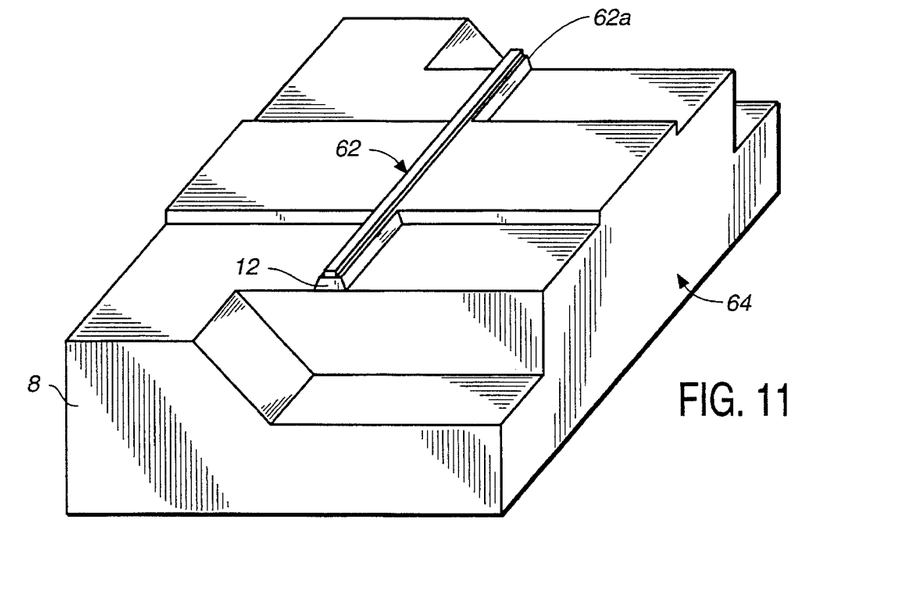

The coupling support shown in FIG. 11 is also an optical bi-fibre support in which the parts of the substrate located on the same side of the guide 62 (to the right in FIG. 11) and on either side of the cleaved faces 12 and 62a of the guide 62 have been eliminated by etching the substrate, either simultaneously with the etching of the substrate freeing the beams, or at the end of the process using an appropriate mask.

As indicated hereinbefore, the shape of the nitride mask fixes the shape of the recess in the <1,0,0> plane. Thus, using a mask like that shown in FIG. 12 in plan view, a recess such as that shown in FIGS. 13a, 13b, respectively in longitudinal section and in perspective view is obtained.

Figure 12:
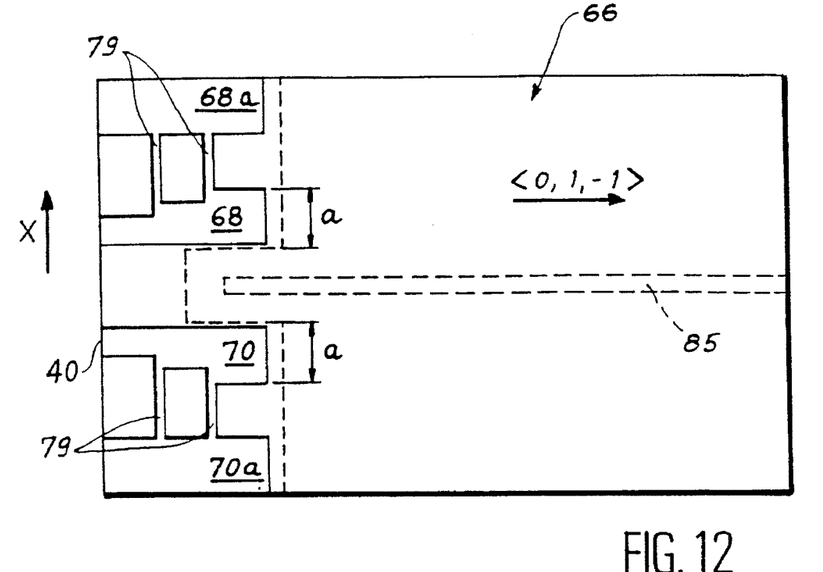
FIG. 12 A variant of the substrate etching mask.

In particular, the mask 66 of FIG. 12 has two first lateral openings 68 and 70 oriented in the direction <0,1,-1>, whose width a, measured parallel to the direction x parallel to the beam cleaving plane, increases progressively with respect to the axis of the guide 85 (here from the specimen outside to its inside), and in sequential manner, thus leading to the formation of steps in plan view for the mask.

Figure 13A:
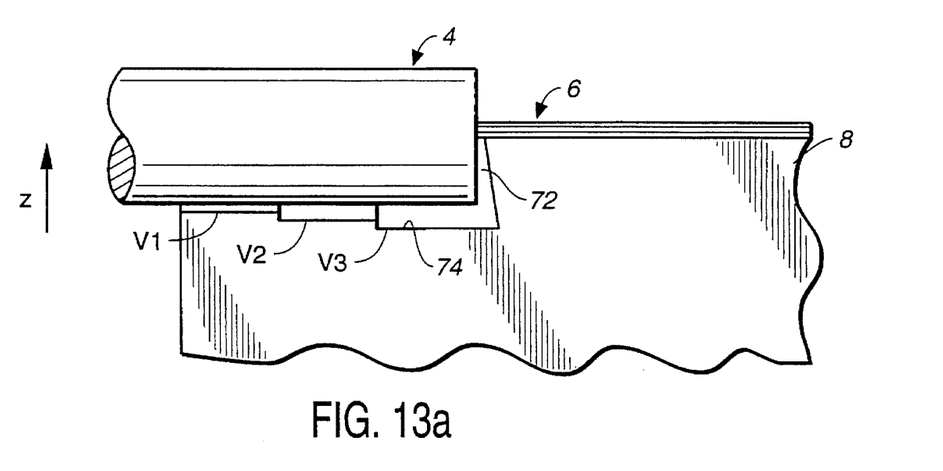
FIGS. 13a, 13b, 13c & 13d The etching of the substrate beneath the beam with several successive V's obtained with the aid of the mask of FIG. 12.
Figure 13B:
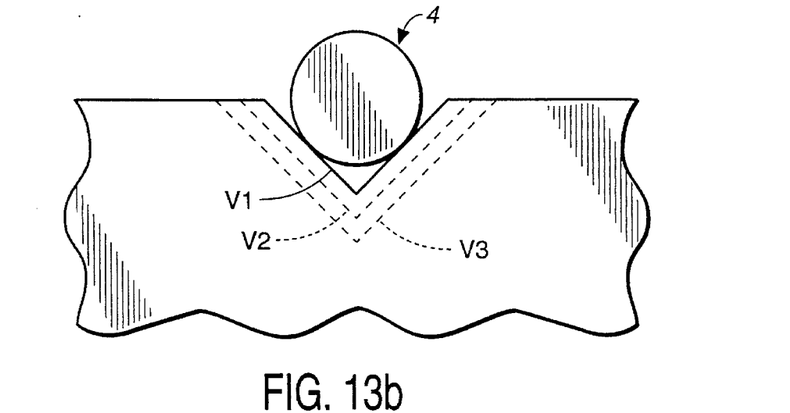

Using the chemical etching described hereinbefore and then microcleaving by air jets, in the manner shown in FIGS. 13a and 13b, a recess 72 or subetching of the substrate 8 is obtained defining three successive V's, namely $V_1$, $V_2$, $V_3$, whose branches are parallel, but displaced in the vertical direction z. The branches corresponding to the sections of the plane <2,1,1> by a plane <0,1,-1> perpendicular to the direction of the guide <0,1,-1>. Thus, the dimension of the recess on the surface in accordance with the plane <1,0,0> varies progressively. In addition, the bottom 74 of the recess defines a staircase.

This system permits a precise vertical positioning of the optical fibre 4, as a function of whether it rests on the plane <2,1,1> of the V $V_1$ or the plane <2,1,1> of the V, $V_2$, etc. For example, an increase of the opening measured on the surface of the V of 1 μm will lead to a descent of the axis of the fibre by 0.35 μm.

If the optical axis of the fibre is too high compared with the optical axis of the strip guide 6, it is necessary to eliminate the V $V_1$ so that the optical axis of the fibre descends and the fibre rests on the planes <2,1,1> of the V $V_2$, etc.

For this purpose, during the chemical etching of the substrate and using an appropriate mask "humbugs" (FIGS. 13c and 13d) are formed, like 76a, 76b, 78a, 78b, whose facing faces respectively 80a and 82a for the humbugs 76a and 78a and 80b, 82b for the humbugs 76b and 78b are the planes <2,1,1> of the substrate and thus constituting the "planes" of the V's.

Figure 13C:
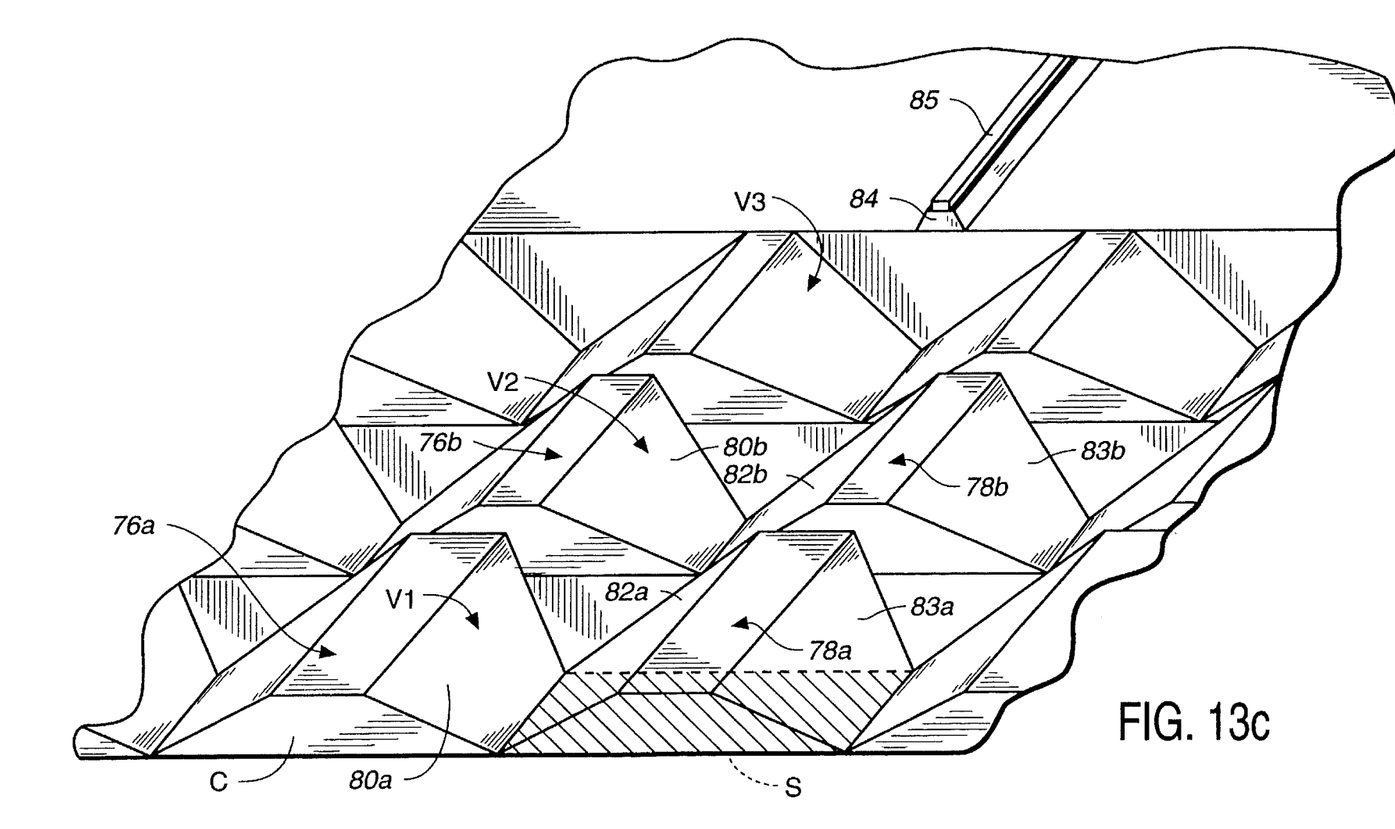
Figure 13D:
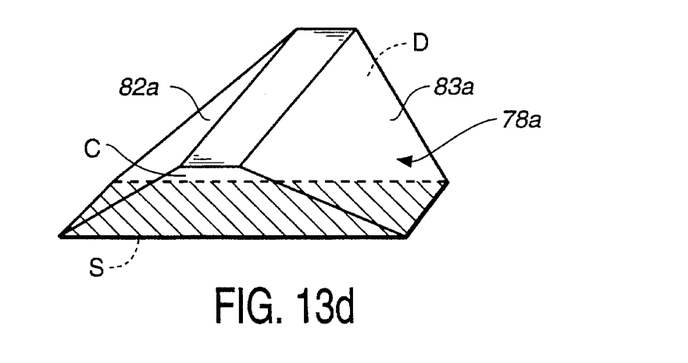

The elimination by simple fracture of the humbugs 76a, 78a permits the elimination of the V $V_1$. In the same way, the elimination of the humbugs 76b, 78b permits the elimination of the V $V_2$ and consequently the positioning of the fibre 4 with respect to the cleaved face 84 of the guide 85 in $V_3$. In order to produce these different humbugs which can be eliminated by simply tearing off, the etching mask must be modified in the manner shown in FIG. 12. It has two complimentary openings, respectively 68a, 70a, also located in accordance with direction <0,1,-1>.

Thus, in particular in the crystal planes <2,1,1>, these openings give the faces 78a and 83a of the humbug 78a. Other openings 79 (FIG. 12) parallel to the axis x a few um wide and spaced by about 100 um will reveal by chemical etching the planes formed by faces C and D of humbug 78a (cf. FIG. 13d). This humbug 78a is only attached to the substrate by its easily breakable base surface S. (The other humbugs are similar thereto and obtained in the same way).

Figure 14:
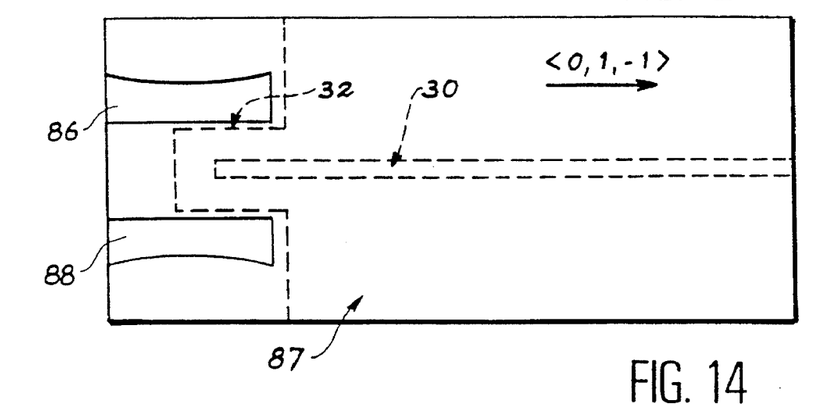
FIG. 14 Another variant of the substrate etching mask.

Another non-sequential, precise positioning system, but which varies in a continuous manner can be obtained with a mask 87 like that shown in FIG. 14 and whose openings 86 and 88 consequently vary continuously in a double cone shape.

Figure 15A:
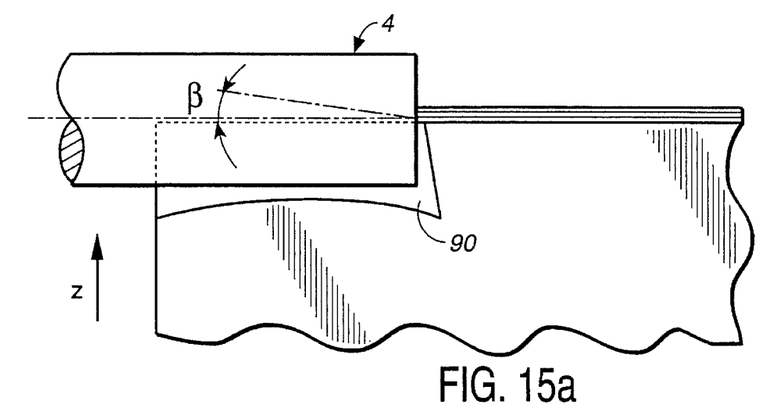
FIG. 15 The substrate etched using the mask of FIG. 14.
Figure 15B:
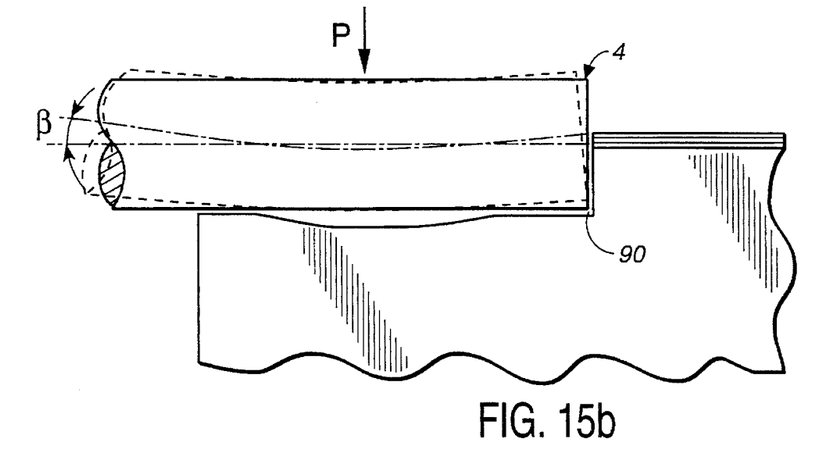

This mask makes it possible to obtain a V-shaped etching 90, as shown in FIGS. 15a and 15b, with a slightly curved bottom edge, which is respectively convex or concave. By modifying the inclination of the fibre 4 with respect to the <1,0,0> plane of the substrate by an angle β (e.g. by pressure P in FIG. 15b), it is possible to optimize the coupling between the active zone of the guide and the core of the fibre The angular misalignment β is a few angular minutes. The tilt of the fibre 4 consequently modifies its bearing point on the planes of the V 90.

Figure 16:
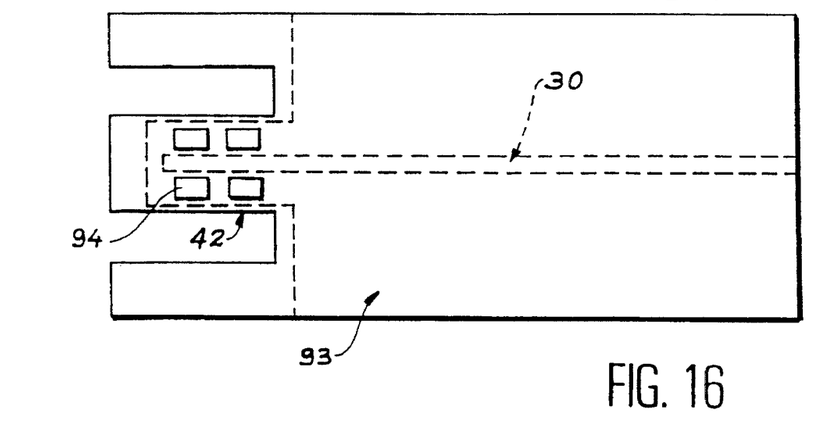
FIG. 16 Another variant of the substrate etching mask.

In order to improve the chemical etching of the substrate in order to free the beam 42 and in particular increase the substrate etching speed, it is possible, in the manner shown in plan view in FIG. 16, to make openings 94 in the nitride mask 93 and which are located in the extension above the beam and therefore the pattern 32.

Figure 17:
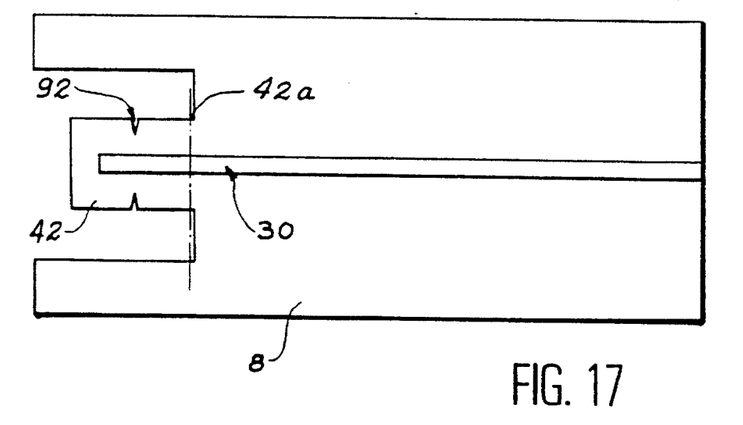
FIG. 17 A variant of the performance of the process according to the invention.

Moreover, in order to facilitate the microcleaving of the beam 42 (cf. FIGS. 8 and 9), it is possible, in the manner shown in plan view in FIG. 17, to make a notch 92 level with the beam 42 and slightly set back from the fixed end 42a serving as a cleaving initiator. This notch can be produced over the entire width of the beam or only on one of the edges or the two edges of the beam. This notch 90 must face the cleaved face 10 (FIG. 1) at a distance of a few μm from the fixed portion in order to become free of the incomplete etching beneath the beam on the cleaved face 10. This notch is produced during the etching of the structure defining the shape of the pattern 32.

The description given hereinbefore has been provided for illustration purposes and other variants are possible. In particular, the optical guide may not be rectilinear and can be constituted by several segments, whereof at least one is parallel to the crystal direction <0,1,−1>.

In other respects, as above mentioned, the optical guide can be formed according to another crystalline direction, and, in particular the direction <0,1,1>. In that case, the V shaped etching is more complicated, for it is no longer possible to use crystalline planes <1,1,1> or <2,1,1> as etch-stop planes. The realization of the structure comprises, at first, the realization of the optical guide the fabrication steps of which are above-described. Once the guide is formed, the whole structure is covered with a protection layer resistant both to chemical etchings and ion etchings. At FIG. 18 this layer has the reference 134. The elements of FIGS. 18–21 which are in common with the previous figures, have corresponding references to which 100 has been added. All the elements are moreover not drawn with the same scale for clearness purposes.

Figure 18:
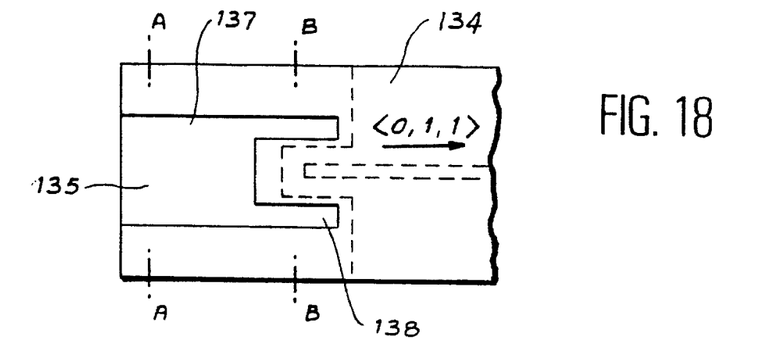
FIG. 18 is a top view illustrating a fabrication step of the support according to a variation of the invention.
Figure 19:
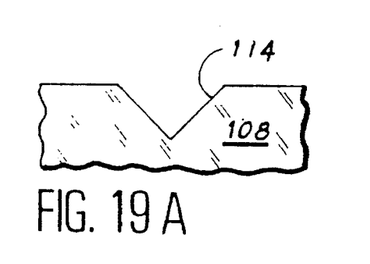
FIGS. 19A and 19B are cross sections of a the support according to said variation of the invention.

In the protection layer 134 a U-shaped opening 135 which surrounds an end of the pattern 132 is formed. the U-shaped opening comprises a said transversal part 137 in front of the end of the pattern, and branches 136, 138 extending on either said of the pattern. The branches 136, 138 correspond respectively to the openings 36 and 38 of FIG. 6A.

An ionic etching, and preferably a reactive ion etching is carried out in the opening 135 of the protective layer 134.

One of the per-se known following techniques is possible: for instance, Reactive Ion Etching, Ion Beam Etching or Reactive Ion Beam Etching.

Thanks to this etching a V shaped etching is performed. The V shaped profile 114 is shown at FIGS. 19A and 19B which are cross-sections of the etched structure, respectively according to lines A and B of FIG. 18.

A further operation consists in forming a beam 142. This beam corresponds to beam 42 of the previous figures. In order to free the beam 142 a selective anisotropic chemical etching is performed, for example a wet chemical etching.

Figure 20:
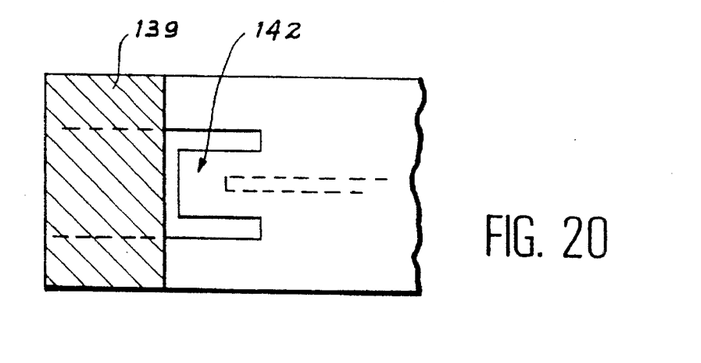
FIG. 20 is a top view, comparable to FIG. 18, illustrating a further fabrication step of the support according to said variation of the invention.

As shown at FIG. 20 before carrying out this etching a mask 139 is nevertheless formed onto the substrate in the region corresponding to part 137 of the opening. This mask protects a portion of the V shaped hollowing to be used subsequently for the fibre-fitting.

Figure 21:
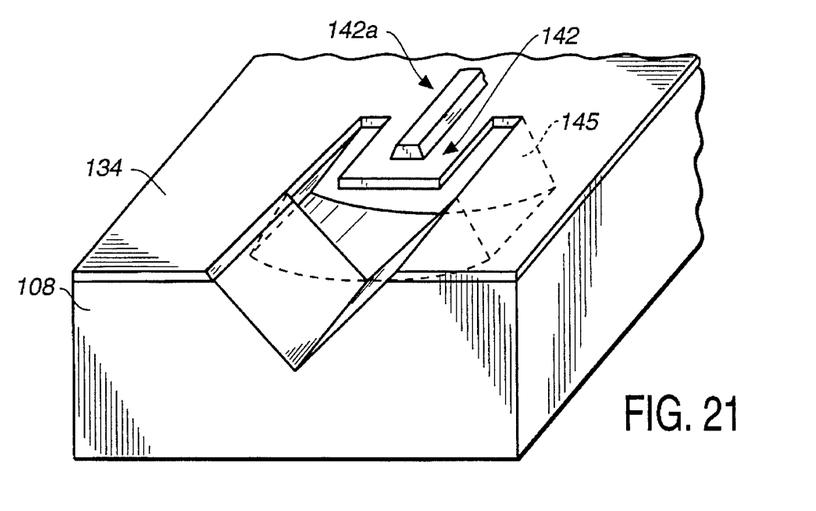
FIG. 21 is a diagrammatical view in perspective of a detail of realization of the support according to said variation of the invention.

The FIG. 31 shows the structure after etching. It appears that below the beam 142 a region 145 of the substrate is etched off, whereas in the protected region of the mask 139, which can be removed after the chemical etching, the lateral faces 114 of the V-shaped profile have remained intact.

When the beam 142 is free a, a pressure, exerted by a fluid jet allows its cleaving at the level of its end 142a.

The process of the invention is suitable for producing an InP-integrated laser-photodetector structure arranged as described in document (6). In addition, the support according to the invention can have several strip guides parallel to the cleaved face, each guide being coupled, according to the invention, to an optical fibre located in a V.

We claim:

1. Process for the production of an integrated structure having at least one cleaved optical guide, comprising the following stages:

a) successively epitaxying onto a planar surface (16) of a monocrystalline substrate (8), parallel to a first plane of crystal orientation <1,0,0> of the substrate having etching barrier planes (14), an etching barrier layer (18) for the substrate, a lower optical confinement layer (20), an active layer (22) and an upper optical confinement layer (24), b) etching the epitaxied layers in accordance with a desired pattern (32) and so as to form at least one optical guide strip (30), whereof at least one portion is oriented parallel to a first direction of crystal orientation <0,1,−1> of the substrate, c) covering the structure obtained in b) with a protection layer (34) resistant to wet anisotropic chemical etching of the substrate, d) making on either side of the pattern (32) and in the protection layer (34) at least two openings (36, 38) having a longitudinal axis parallel to the first direction of the guide and communicating in a second direction (40) perpendicular to said first direction and parallel to a cleaving plane of the structure, e) subjecting to said anisotropic chemical etching the substrate exposed during stage d), said etching operation bringing about an etching (12) of the substrate and the formation of at least one beam (42) oriented according to the first direction and having a free end (42a) and a fixed end; and f) subjecting said beam to the action of a pressurized fluid jet bringing about the cleaving of the beam at the level of its fixed end (42a).

2. Process according to claim 1, characterized in that the substrate (8) is of InP.

3. Process according to claim 2, characterized in that the etching barrier layer (18) is of GaInAsP.

4. Process according to claim 1, characterized in that with the first direction being the orientation 0,1,−1, a V-shaped etching is obtained, whose branches are perpendicular to said first direction and perpendicular to said planar surface (16).

5. Process according to claim 1, characterized in that the fluid jet is an air jet.

6. Process according to claim 1, characterized in that the protection layer (34) is eliminated before cleaving the beam.

7. Process according to claim 1, characterized in that the protection layer (34) is of silicon nitride.

8. Process according to claim 1, characterized in that at least one notch (92) is formed in the structure level with the fixed end, prior to stage f), and serving as a cleaving initiator.

9. Process according to claim 2, characterized in that the confinement layers (20, 24) are of InP and the active layer (22) of GaInAsP.

10. Process according to claim 1, characterized in that stage a consists of successively epitaxying on the InP substrate (8) a GaInAsP etching barrier layer (18), an InP lower optical confinement layer (20), a GaInAsP active layer (22), an InP upper optical confinement layer (24), another GaInAsP etching barrier layer (26) and an upper InP lateral confinement layer (28).

11. Process according to claim 1, characterized in that the openings (68, 70) have a width (a) variable in the second direction.

12. Process according to claim 11, characterized in that the width varies sequentially (68, 70) (FIG. 12).

13. Process according to claim 11, characterized in that the width varies continuously (86, 88) (FIG. 14).

14. Process according to claim 11, characterized in that in the protection layer and on each side of the pattern are formed at least two supplementary openings (68a, 70a) of variable width and in that the etching of the substrate takes place in such a way as to form humbugs (76a, 78a, 76b, 78b) eliminatable by breaking and whose two facing faces (80, 82a; 80b, 82b) define a V.

15. Process according to claim 1, characterized in that openings (94) are formed in the mask in the extension of the pattern (32) and the location provided for the beam (42).

16. Process according to claim 1, characterized in that the structure obtained in f) is etched so as to eliminate at least part of the structure projecting from said cleaving plane.

17. Process according to claim 1, characterized in that the two openings (36, 38) made in the protection layer have, in the direction of the guide, respectively different lengths in order to obtain a dissymetrical cleaving of the beam.

18. Process according to claim 1, characterized in that the openings (36, 38) made in the protection layer have, according to the longitudinal axis respectively, an outer crenelated edge.

19. Process for the production of an integrated structure having at least one cleaved optical guide, comprising the following stages:

a) successively epitaxying onto a planar surface (116) of a monocrystalline substrate (108), parallel to a first plane of crystal orientation <1,0,0>, an etching barrier layer for the substrate, a lower optical confinement layer, an active layer and an upper optical confinement layer, b) etching the epitaxied layers in accordance with a desired pattern (132) and so as to form at least one optical guide strip (130), whereof at least one portion is oriented parallel to a first direction of crystal orientation <0,1,1> of the substrate, c) covering the structure obtained in b) with a protection layer (134) resistant to a chemical etching and to a ion etching, d) making in the protection layer a U-shaped opening (135) surrounding an end of the pattern (132), said U-shaped opening comprising a said transversal part (137) in front of the end of the pattern and branches (136, 138) extending on either side of a portion of the pattern, e) carrying out a ion etching in the opening (135) for obtaining a V-shaped etching the branches of which are perpendicular to said first direction and perpendicular to said planar surface, f) covering the substrate in a region corresponding to the transversal part (137) of the opening (135) with a mask resistant to anisotropic chemical etching, g) carrying out a selective anisotropic chemical etching in a part of the opening comprising the branches so as to form a beam oriented according to the first direction, and having a free end and a fixed end, and h) subjecting said beam to the action of a pressurized fluid jet bridging about the cleaving of the beam at the level of its fixed end (142a).

* * * * *